May 15, 1934.  F. D. CHAPMAN  1,959,123

CAN TRANSFERRING MECHANISM

Original Filed Nov. 27, 1931

INVENTOR.
F. D. Chapman
BY
Morsell, Lieber & Morsell
ATTORNEYS.

Patented May 15, 1934

1,959,123

UNITED STATES PATENT OFFICE 1,959,123

CAN TRANSFERRING MECHANISM

Frank D. Chapman, Berlin, Wis.

Original application November 27, 1931, Serial No. 577,533. Divided and this application May 24, 1933, Serial No. 672,543

10 Claims. (Cl. 198—22)

The present invention relates to improvements in the construction and operation of mechanism for transferring cylindrical bodies such as cans, from one type of conveyor to another.

This application is a division of application Serial No. 577,533, filed November 27, 1931, now Patent 1,924,271 granted August 29, 1933, and it is an object of the present invention, to provide improved apparatus for effectively transferring bodies such as circular containers from one type of conveyor such as a moving chain, to another type such as a bladed rotor, and vice versa.

Another object of the invention is to provide improved mechanism for transferring cylindrical food-laden cans in succession from one continuously functioning conveyor to another, without impact and resultant danger of damaging the loaded containers.

These and other objects and advantages will be apparent from the following detailed description.

A clear conception of the features constituting the present invention, and of the mode of constructing and of operating can transferring mechanisms built in accordance with the improvement, may be had by referring to the drawing accompanying and forming a part of this specification in which like reference characters designate the same or similar parts in the several views.

While the invention has been shown and described herein as being specifically applied to a cooling or processing unit for treating cylindrical food-laden tin cans, it is not intended to limit the scope by such specific embodiment, since some of the features are obviously more generally applicable to the transportation of other types of containers or bodies.

Figure 1:
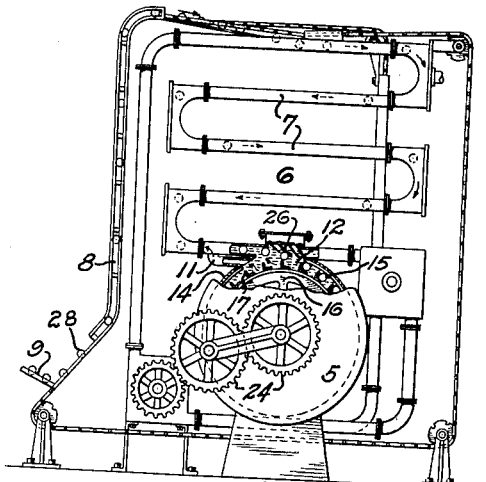
Fig. 1 is an end elevation of a can cooling unit, having a portion thereof broken away to show the mechanism for transferring the cans from the rectilineal to the rotary conveyor.
Figure 2:
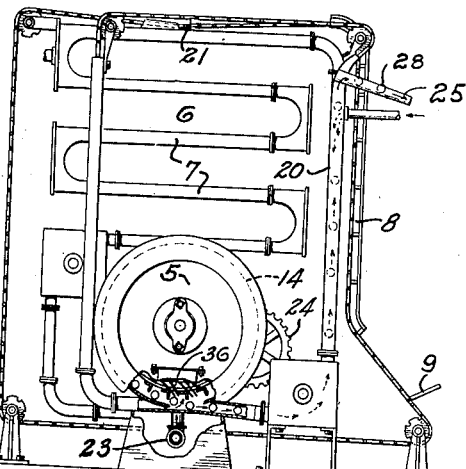
Fig. 2 is an opposite end elevation of the can cooling unit, likewise having a portion thereof broken away to show the mechanism for transferring the cans from the rotary to the rectilineal conveyor.

The food processing system or unit shown generally in Figs. 1 and 2, comprises a final drum type of cooler 5, and an initial conduit type of cooler 6 associated with the inlet end of the cooler 5. This apparatus is especially adapted for the treatment in succession, of highly heated food-laden containers such as cylindrical tin cans.

The initial cooler 6 consists of an irregular conduit 7 surrounded by an outer endless chain conveyor 8 which is adapted to deliver the successive food laden cylindrical cans 28 from a supply chute 9 to the upper open end of the conduit 7. The interior of the conduit 7 is provided with another endless can transporting chain conveyor 10 which functions to gradually propel the cans 28 in succession, downwardly through the conduit 7 in spaced relation, and the lower portion of the conduit 7 communicates directly with the upper part of the inlet end of the final cooler 5, through a liquid transfer conduit 11 and a can receiving opening 12.

The final cooler 5 is of the drum type, and consists of an outer cylindrical fixed casing 12 having stationary helical can guides 15 secured to the interior thereof, and a rotor 16 rotatably supported within the casing 14 and having a series of parallel radial flights 17 adapted to urge the successive cans spirally along the helical guides 15 and within the casing 14. The discharge end of the cooler casing 14 communicates through a lower opening with a delivery conduit 20 having an endless chain type of conveyor 21 operable therein, and this conduit 20 rises to substantially the same height as the conduit 7 of the initial cooler. The final cooler 5 may be provided with a liquid supply pipe 23, and the liquid admitted to the casing 14, subsequently rises through the conduits 7, 20. The rotor 16 and the endless chain conveyors 8, 10, 21 are simultaneously operable by means of gearing 24, and the finally treated cans 28 are delivered from the upper portion of the conduit 20 over a discharge chute 25.

Figure 3:
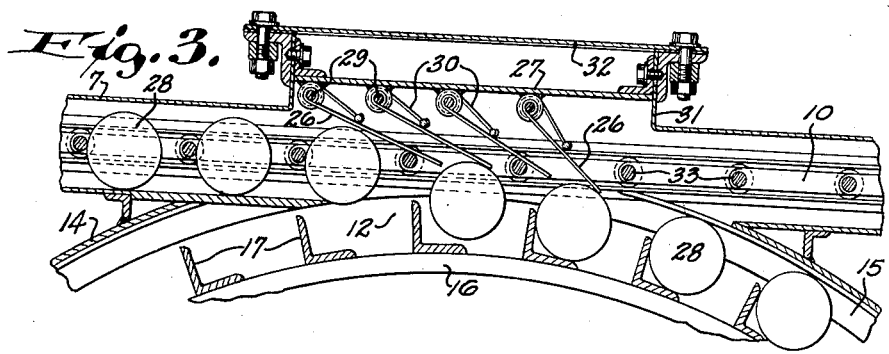
Fig. 3 is an enlarged fragmentary section through the mechanism for transferring the cans in succession from the rectilineal to the rotary conveyor.
Figure 4:
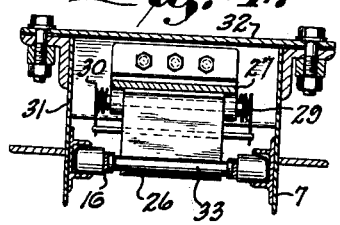
Fig. 4 is a similarly enlarged section taken transversely through the can transferring mechanism of Fig. 3.

The improved mechanism for transferring the successive cans 28 from the rectilineal substantially horizontal lower portion of the conduit 7 through the opening 12 and into the spaces between the successive flights 17 of the rotor 16, is shown in detail in Figs. 3 and 4. As shown, this mechanism comprises a series of four resilient fingers 26 pivotally supported upon a plate 27 disposed above the path of travel of the adjacent portion of the chain conveyor 10, and the fingers 26 are adapted to bear upon the upper peripheral portions of the circular cans 28 as they approach and pass through the can delivery opening 12. The fingers 26 are swingably mounted upon pivot pins 29, and are constantly urged toward the adjacent part of the endless conveyor 10 by means of springs 30, and the supporting plate 27 is removably mounted within a housing 31 having a detachable cover 32. The fingers 26 obviously function to quickly and positively push the successive cans 28 out of the path of the conveyor 10 and through the opening 12 into the path of the revolving flights 17 of the rotor 16, the downward swinging motion of the fingers 26 being limited by the successive conveyor pins 33. Since the pins 33 and flights 17 are operating in unison and are spaced apart substantially equal distances, the cans 28 which are submerged in liquid, will be gently but positively transferred from the rectilineal conveyor 10 to the revolving rotor 16 without impact.

Figure 5:
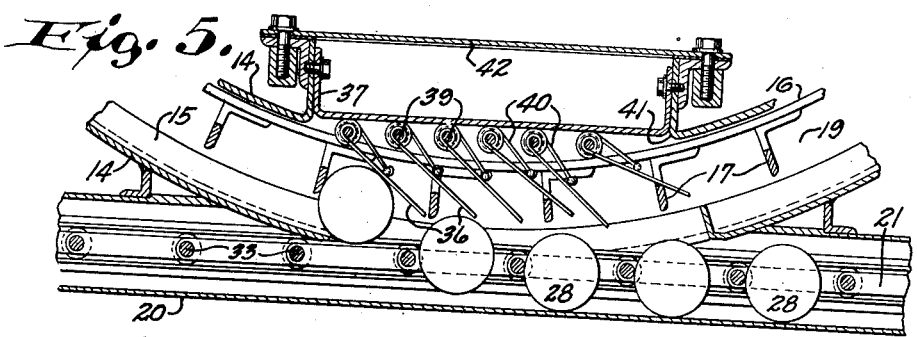
Fig. 5 is a likewise enlarged fragmentary section through the mechanism for transferring the cans in succession from the rotary to the rectilineal conveyor.
Figure 6:
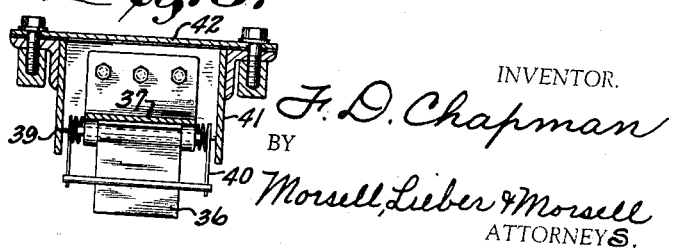
Fig. 6 is a similarly enlarged section taken transversely through the can transferring mechanism of Fig. 5.

The improved mechanism for transferring the cans 28 in succession from the rotor 16 to the lower rectilineal and substantially horizontal portion of the chain conveyor 21, is shown in detail in Figs. 5 and 6. As shown, this mechanism comprises a series of six resilient fingers 36 pivotally supported upon a dished plate 37 disposed above the path of travel of the lower flights 17, and the fingers 36 are adapted to bear downwardly upon the successive cylindrical cans 28 as they advance toward and pass through the discharge opening of the casing 14. The fingers 36 are mounted upon pivot pins 39 and are constantly urged toward the adjacent flights 17 by means of springs 40, and the supporting plate 37 is removably mounted within a stationary casing 41 secured to the casing 14 and having a detachable cover 42 accessible through the cup-shaped end head of the casing 14. The fingers 36 are obviously capable of positively and quickly ejecting the successive cans 28 from the path of revolution of the flights 17 of the rotor 16, and the downward swinging motion of the fingers 36 is limited by the cut-away ends of the flights 17 as shown in Fig. 5. As these flights 17 and pins 33 again operate in unison and are similarly spaced, the submerged cans 28 will likewise be gently but positively transferred in succession from the rotor 17 to the rectilineal conveyor 21, without shock and resultant danger of damaging the cans.

The normal operation of the improved can transfer mechanism should be readily apparent from the foregoing description of the details of construction thereof. The conveyors 8, 10, 21 and the rotor 16 are operated simultaneously and at an appropriate speed, by the gearing 24, and the successive food-laden cans 28 are being constantly advanced to, through and from the coolers 5, 6 without danger, the fingers 26, 36 functioning to automatically transfer the cans 28 from one conveyor to the other. As the cans 28 are rolled along the bottom of the conduit 7 by the conveyor 10 and approach the inlet opening 12 of the casing 14, they are engaged by the resiliently restrained fingers 26 and are automatically pushed out of the openings between the successive pins 33 of the conveyor 10, and are forced into the spaces between the successive can transporting flights 17 in opposition to the buoyancy of the cans and to the flow of liquid from the casing 14 into the conduit 7. The revolving flights 17 immediately transport the cans 28 along the guides 15 within the casing 14, thus effecting the actual transfer without shock or damage. As the cans 28 reach the delivery end of the casing 14, the fingers 36 act to automatically transfer the cans in a similar manner, from the flights 17 to the conveyor 21, without shock or damage.

From the foregoing description it will be apparent that the present invention provides simple, compact and highly effective mechanism for automatically transferring a succession of circular cans or the like, from one type of conveyor to another. The transference is positive, and will not endanger the cans, and the transferring mechanism is readily accessible for inspection by virtue of the removable closure plates 32, 42.

It should be understood that it is not desired to limit the invention to the exact details of construction and operation herein shown and described, for various modifications within the scope of the claims may occur to persons skilled in the art.

It is claimed and desired to secure by Letters Patent:

1. In combination, a conduit having a chain conveyor therein, a casing having a can transporting rotary conveyor therein, and means including a series of pusher elements successively cooperable with each can for positively transferring cans in succession from one of said conveyors to the other while in operation.

2. In combination, an endless chain conveyor having spaced can transporting elements, a rotary conveyor having spaced can transporting elements movable in proximity to the transporting elements of said chain conveyor, and means including a series of pusher elements successively cooperable with each can for positively transferring successive cans from the spaces between said elements of one of said conveyors into the adjacent spaces of the other while said conveyors are in motion.

3. In combination, a conveyor for advancing cans in succession along substantially a straight line, another conveyor for advancing cans in succession around an axis, and a series of resilient fingers successively cooperable with each can for transferring the cans from one of said conveyors to the other while in motion.

4. In combination, two conveyors having can receiving spaces movable in step and in proximity to each other, and a series of elements successively cooperable with each can for pushing the cans from the spaces of one of said conveyors into the spaces of the other while in motion.

5. In combination, two conveyors having can receiving spaces movable in step and in close proximity to each other, and a series of resilient fingers successively cooperable with each can for pushing the cans from the spaces of one of said conveyors into the spaces of the other while said conveyors are in motion.

6. In combination, two conveyors having receiving spaces for a series of cylindrical bodies movable in close proximity to each other, and a plurality of resilient fingers engageable in succession with each of the successive bodies to positively push the same from the spaces of one of said conveyors into those of the other while in motion.

7. In combination, a chain conveyor, a rotary conveyor operable in unison with said chain conveyor, and a plurality of resilient elements engageable in succession with each of a series of cylindrical bodies for transferring said bodies in succession from one of said conveyors to the other while in motion.

8. In combination, a conveyor for advancing cans in succession along substantially a straight line, another conveyor for advancing cans in succession around an axis, and a series of resilient fingers fixedly mounted in a zone common to the paths of said conveyors for transferring the cans from one of said conveyors to the other while in motion.

9. In combination, two conveyors having can receiving spaces movable in step and in proximity to each other, a series of elements successively engageable with each of a series of cans for pushing the cans from the spaces of one of said conveyors into the spaces of the other while in motion, and removable means for effecting access to said elements.

10. In combination, two conveyors having can receiving spaces movable in step and in close proximity to each other, a series of resilient fingers for pushing the cans from the spaces of one of said conveyors into the spaces of the other while said conveyors are in motion, said fingers being fixedly mounted in a zone common to the paths of said conveyors, and means for effecting access to said fingers.

FRANK D. CHAPMAN.